United States Patent [19]

Fields

[11] Patent Number: 4,655,574
[45] Date of Patent: Apr. 7, 1987

[54] DROP-IN LOADING CAMERA

[75] Inventor: Roger A. Fields, Pittsford, N.Y.

[73] Assignee: Eastman Kodak Company, Rochester, N.Y.

[21] Appl. No.: 818,163

[22] Filed: Jan. 13, 1986

[51] Int. Cl.⁴ .......................... G03B 1/00; G03B 17/02
[52] U.S. Cl. ..................................... 354/288; 354/212
[58] Field of Search ............... 354/212, 213, 214, 215, 354/288

[56] References Cited

U.S. PATENT DOCUMENTS

| | | | |
|---|---|---|---|
| 4,332,453 | 6/1982 | Seely | 354/288 |
| 4,429,977 | 2/1984 | Sekine et al. | 354/212 |
| 4,469,421 | 9/1984 | Kamata | 354/288 |
| 4,505,562 | 3/1985 | Hara et al. | 354/212 |
| 4,516,843 | 5/1985 | Ohmura | 354/288 |

Primary Examiner—A. A. Mathews
Attorney, Agent, or Firm—Roger A. Fields

[57] ABSTRACT

A photographic camera is adapted for use with a film cartridge having a tongue portion from which a curled film leader projects. The projecting leader comprises a relatively short full width section adjacent the tongue portion and a relatively long reduced width section separated from the tongue portion by the full width section. Integral means is provided in a loading chamber of the camera body for supporting the cartridge at its throat portion to locate the full width section of the leader away from the camera body during axial insertion of the cartridge initially into the loading chamber. This will prevent the forward longitudinal edge of the full width section of the leader from jamming against the camera body to interfere with film loading. A straightening member along the camera body contacts the forward longitudinal edge of the reduced width section of the leader to uncurl that section in response to continued axial insertion of the cartridge into the loading chamber.

5 Claims, 3 Drawing Figures

DROP-IN LOADING CAMERA

BACKGROUND OF THE INVENTION

1. Field of the Invention

The invention relates generally to photographic cameras and in particular to those cameras adapted to receive a film cartridge in an axial direction. More particularly, the invention relates to a camera which can be loaded with a film cartridge by simple axial insertion of the cartridge into the camera without the need to touch or manipulate a film leader projecting from the cartridge.

2. Description of the Prior Art

In known bottom-loading 35 mm cameras, the film cartridge is received in an axial direction through a bottom opening into a loading chamber of the camera. At the same time, the film leader projecting from a light-tight opening in a throat portion of the cartridge is received longitudinal edge first in an elongate opening at the rear of the camera. The elongate opening extends between the loading chamber and a film take-up chamber in the camera. Typically, some difficulty has existed in loading the film cartridge in such a camera. For example, in the Leica M4 series and the later M5 series, the normally curled leader must first be manually uncurled. Then, with the leader held straight, the cartridge is inserted in an axial direction through a bottom opening into a loading chamber in the camera. At the same time, the leader is inserted longitudinal edge first into a guide slot connecting the loading chamber and a film take-up chamber. In the Leicas, the loading chamber is shaped to constrain the cartridge with the light-tight opening in the throat portion of the cartridge facing in the direction of film advance to the take-up chamber. An attempt to axially insert the cartridge into the loading chamber without first manually uncurling the leader will cause the forward longitudinal edge of the full width (uncut) section of the leader adjacent the throat portion to jam against the bottom of the camera. This will prevent further insertion of the cartridge into the loading chamber without tearing or otherwise damaging the leader. Thus, in the Leicas, film loading requires a certain amount of manual dexterity and care must be taken to ensure that the leader is held straight.

More recently, bottom-loading 35 mm cameras have been devised which include integral means for automatically uncurling the film leader as the cartridge is inserted axially through the bottom opening into a loading chamber in the camera. For example, in commonly assigned U.S. Pat. No. 4,332,452, granted June 1, 1982, the automatic uncurling means comprises a quarter-round corner located adjacent the loading chamber in the camera and an inclined straight edge extending generally along the bottom of the camera. When the cartridge is initially inserted into the loading chamber, the full width (uncut) section of the leader adjacent the throat portion of the cartridge is pushed against the quarter-round corner. The quarter-round corner in turn deflects the full width section of the leader to position the reduced width (cut) section of the leader forward of the full width section crosswise against the inclined straight edge. Then, with continued insertion of the cartridge into the loading chamber, the reduced width section of the leader is progressively straightened by its movement against the inclined straight edge.

Although known bottom-loading 35 mm cameras which include automatic uncurling means for the film leader appear to work satisfactorily, the structure in the camera comprising such means may tend to increase manufacturing costs to a significant extent.

SUMMARY OF THE INVENTION

The above-described problems associated with known 35 mm bottom-loading cameras are believed solved by the invention. Specifically, the invention provides relatively inexpensive means for quickly and easily loading a film cartridge into a photographic camera. This is accomplished for the most part by providing integral means in the loading chamber of the camera body for supporting the cartridge, preferably at its throat portion, to locate the full width (uncut) section of the leader adjacent the throat portion away from the camera body during axial insertion of the cartridge initially into the loading chamber. This will prevent the forward longitudinal edge of the full width section of the leader from abutting against the camera body as, for example, occurs in the prior art Leica M4 and M5 series when the leader is not manually held straight. With such an improved design, a conventional straight edge along the camera body can operate to contact the forward longitudinal edge of the reduced width (cut) section of the leader adjoining the full width section to uncurl the reduced width section in response to continued axial insertion of the cartridge into the loading chamber.

BRIEF DESCRIPTION OF THE DRAWINGS

The invention will be described in connection with the drawings, wherein.

DESCRIPTION OF THE PREFERRED EMBODIMENT

The invention is disclosed as being embodied preferably in a 35 mm still-picture camera. Because such a photographic camera is generally known, this description is directed in particular to camera elements forming part of or cooperating directly with the disclosed embodiment. It is to be understood, however, that camera elements not specifically shown or described may take various forms known to persons of ordinary skill in the art.

Figure 1:
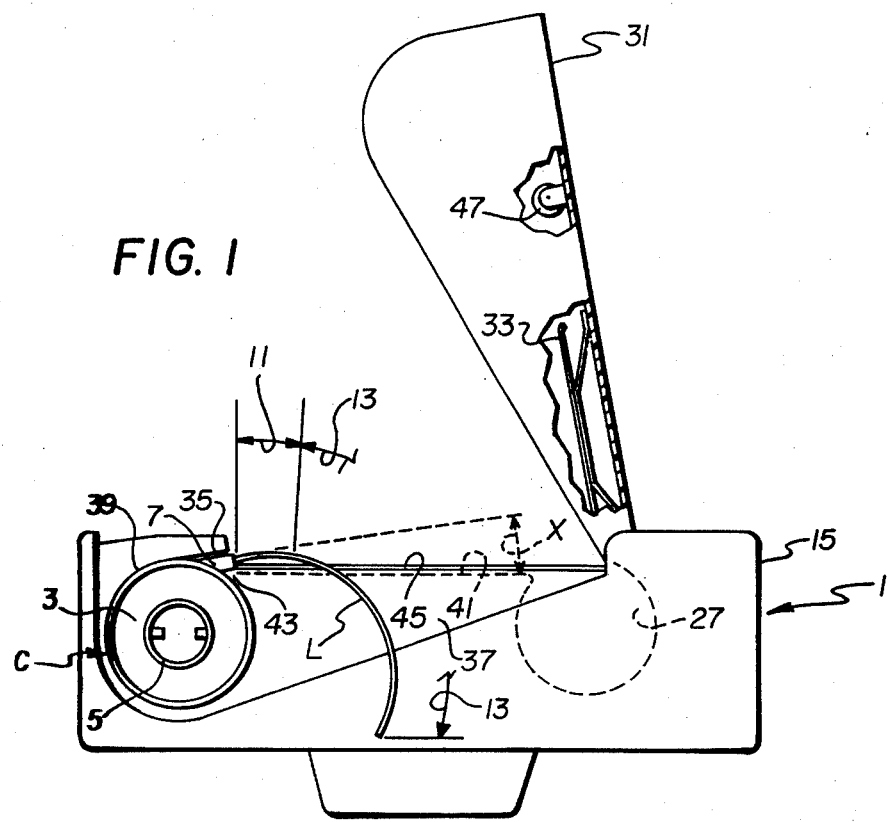
FIG. 1 is a bottom view of a bottom-loading 35 mm camera in accordance with a preferred embodiment of the invention, illustrating a film cartridge positioned with its throat portion inclined at an acute angle with respect to a rear elongate opening in the camera body to locate the full width section of the film leader adjacent the throat portion away from the camera body.
Figure 3:
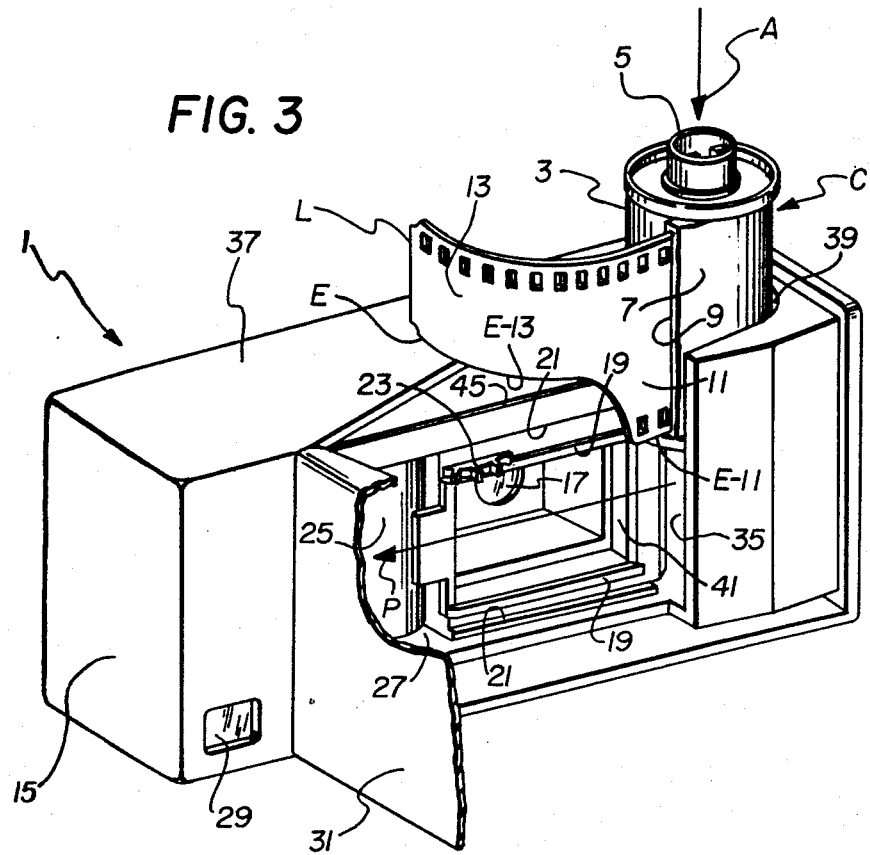
FIG. 3 is a rear perspective view of the bottom-loading camera and the cartridge.

Referring now to the drawings, and in particular to FIGS. 1 and 3, a bottom-loading camera 1 is shown for use with a conventional 35 mm film cartridge C, such as manufactured by Eastman Kodak Company. The cartridge C comprises a cylindrical body portion 3 housing a rotatably supported spool 5 on which is wound an edge-perforated 35 mm filmstrip. A tongue portion 7 of the cartridge C extends generally in a tangential manner from the cylindrical body portion 3. The filmstrip has a normally curled leader L longitudinally projecting from a plush-lined, light-tight opening 9 in the tongue portion 7. As can be seen in FIG. 3, the projecting leader L comprises a relatively short full width (uncut) section 11 adjacent the light-tight opening 9 and a relatively long reduced width (cut) section 13 separated from the light-tight opening by the full width section. The projecting leader L extends a predetermined length, e.g., 2¼ in., from the light-tight opening 9 and originally is curled about the cylindrical body portion 3. Typical lengths of the full width and reduced width sections 11 and 13 of the projecting leader L are ½ in. and 1¾ in., respectively.

The bottom-loading camera 1 comprises a camera body 15 in which is provided a number of commonplace elements, such as a picture taking lens 17, a pair of substantially parallel film plane rails 19 for supporting successive film frames in the focal plane of the lens, a pair of substantially parallel film guides or film edge-limiting members 21 which define the lateral limits of a film advance path indicated by the arrow P in FIG. 3, a film metering sprocket 23 in the film path, a film take-up drum 25 rotatably supported within a fillm take-up chamber 27, and a viewfinder window 29. A rear door 31 pivotably connected to the camera body 15 supports a pressure plate 33, shown in FIG. 1, for maintaining a film frame flat on the pair of film plane rails 19 during picture-taking.

A loading chamber 35 in the camera body 15 is only accessible at the bottom 37 of the camera body, through an entrance opening 39 to the loading chamber. The entrance opening 39 is uncovered by opening the rear door 31, as shown in FIGS. 1 and 3. This permits the cartridge C to be inserted in an axial direction indicated by the arrow A, through the entrance opening 39 into the loading chamber 35. At the same time, the projecting leader L is received longitudinal edge E first in an elongate opening 41 at the rear of the camera body 15. The elongate opening 41 extends from the loading chamber 35 to the take-up chamber 27 to permit the projecting leader L to come to rest between the pair of film edge-limiting members 21 and to permit the metering sprocket 23 and the take-up drum 25 to engage the leader. Although not shown, the teeth of the metering sprocket 23 are inclined to facilitate movement of the longitudinal edge E of the projecting leader L over such teeth during movement of the leader into the elongate opening 41.

Figure 2:
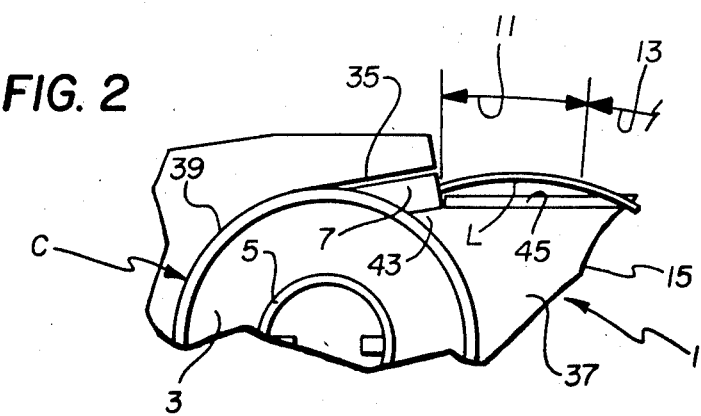
FIG. 2 is an enlarged view of integral means in the camera body for supporting the throat portion of the cartridge at the acute angle.

When the cartridge C is initially inserted into the loading chamber 35, a positioning member 43 in the loading chamber is received in the juncture between the cylindrical body portion 3 and tongue portion 7 of the cartridge. As shown in FIGS. 1 and 2, the positioning member 43 supports the tongue portion 7 of the cartridge C inclined at an acute angle X with respect to the elongate opening 41 to locate the full width section 11 of the projecting leader L away from the camera body 15. This prevents the forward longitudinal edge E-11 of the full width section 11 from abutting against the bottom 37 of the camera body 15 in the vicinity of the entrance opening 37 to the loading chamber 35. See FIG. 3. With continued insertion of the cartridge C into the loading chamber 35, a bottom beveled-edge 45 of the camera body 15, which extends substantially parallel to the elongate opening 41, will contact the forward longitudinal edge E-13 of the reduced width section 13 of the projecting leader L to thereby uncurl the reduced width section before that section can be received in the elongate opening. In essence, the bottom edge 45 of the camera body 15 contacts the forward longitudinal edge E-13 of the reduced width section 13 in a crosswise manner, as shown in FIGS. 1 and 3, which causes the bottom edge to progressively uncurl the reduced width section as the cartridge C is inserted further into the loading chamber 35.

Once the cartridge C is completely inserted into the loading chamber 35, the reduced width section 13 of the leader L comes to rest along the film advance path P in the elongate opening 41, and the rear door 31 may be closed. An idler roller 47, shown in FIG. 1, is supported on the rear door 31 at a location proximate the pressure plate 33 to urge the full width section 11 of the leader L into the elongate opening 41 as the door is closed.

While the positioning member 43 for supporting the tongue portion 7 of the cartridge C inclined at the acute angle X is unique, the bottom edge 45 which uncurls the reduced width section 13 of the leader L is similar in appearance (not function) to known structure. Thus, with the invention, no special uncurling means is required.

The invention has been described in detail with particular reference to a preferred embodiment thereof, but it will be understood that variations and modifications can be effected within the spirit and scope of the invention.

I claim:

1. An improved photographic camera for use with a film cartridge from which a curled film leader projects, the projecting leader having a relatively short full width section adjacent the cartridge and a relatively long reduced width section separated from the cartridge by the full width section, wherein the camera body is of the type having (a) a loading chamber for receiving the cartridge in an axial direction and (b) an elongate opening for receiving the projecting leader with a longitudinal edge forward as the cartridge is inserted into said loading chamber, and wherein the improvement comprises:
   means on said camera body for contacting the forward longitudinal edge of the reduced width section of the projecting leader, previous to that section being received in said elongate opening, to uncurl the reduced width section in response to axial loading of the cartridge into said loading chamber; and
   means in said loading chamber for supporting the cartridge to locate the full width section of the projecting leader away from said camera body during axial loading of the cartridge initially into said loading chamber, to prevent the forward longitudinal edge of the full width section of the leader from abutting against said camera body.

2. An improved photographic camera for use with a film cartridge having a tongue portion from which a curled film leader projects, the projecting leader having a relatively short full width section adjacent the tongue portion and a relatively long reduced width section separated from the tongue portion by the full width section, wherein the camera body is of the type having (a) a loading chamber for receiving the cartridge in an axial direction and (b) an elongate opening for receiving the projecting leader with a longitudinal edge forward as the cartridge is inserted into said loading chamber, and wherein the improvement comprises:
   means on said camera body for contacting the forward longitudinal edge of the reduced width section of the projecting leader, previous to that section being received in said elongate opening, to uncurl the reduced width section in response to axial loading of the cartridge into said loading chamber; and means in said loading chamber for supporting the tongue portion of the cartridge inclined at an acute angle with respect to said elongate opening to locate the full width section of the projecting leader away from said camera body during axial loading of the cartridge initially into said loading chamber, to prevent the forward longitudinal edge of the full width section of the leader from abutting against said camera body.

3. The improvement as recited in claim 2, wherein the tongue portion of the cartridge forms a juncture with a cylindrical body portion of the cartridge, and wherein said supporting means includes a support member receivable at the juncture to support the tongue portion at said acute angle.

4. An improved photographic camera for use with a film cartridge having a tongue portion from which a curled film leader projects, the projecting leader having a relatively short full width section adjacent the tongue portion and a relatively long reduced width section separated from the tongue portion by the full width section, wherein the camera body is of the type having (a) a loading chamber for receiving the film cartridge in an axial direction and (b) an elongate opening at the rear of said camera body for receiving the projecting leader with a longitudinal edge forward as the cartridge is inserted into said loading chamber, and wherein the improvement comprises:

means in said loading chamber for supporting the tongue portion of the cartridge inclined at an acute angle with respect to said elongate opening to locate the full width section of the projecting leader away from said camera body during axial loading of the cartridge initially into said loading chamber, to prevent the forward longitudinal edge of the full width section of the leader from abutting against said camera body;

edge-defining means on said camera body extending substantially parallel to said elongate opening for contacting the forward longitudinal edge of the reduced width section of the projecting leader, previous to that section being received in said elongate opening, to uncurl the reduced width section in response to axial loading of the cartridge into said loading chamber; and a rear door having guide means movable against the full width section of the projecting leader to urge that section towards said elongate opening as the door is closed.

5. The improvement as recited in claim 4, wherein said rear door has a pressure plate for maintaining the reduced width section of the projecting leader in said elongate opening when the door is closed, and said guide means includes an idler roller positioned proximate said pressure plate to guide the full width section of the leader towards said elongate opening when the door is closed.

* * * * *